(12) United States Patent
Moran (10) Patent No.: US 7,841,147 B2
(45) Date of Patent: Nov. 30, 2010

(54) MORTARLESS FACADE SYSTEM

(76) Inventor: Damian A. Moran, 2111 Pine Valley Cresent, Oakville (CA) L6H 6L8

( * ) Notice: Subject to any disclaimer, the term of this patent is extended or adjusted under 35 U.S.C. 154(b) by 0 days.

(21) Appl. No.: 12/507,655

(22) Filed: Jul. 22, 2009

(65) Prior Publication Data

US 2010/0011688 A1    Jan. 21, 2010

Related U.S. Application Data

(63) Continuation of application No. 11/305,776, filed on Dec. 16, 2005.

(60) Provisional application No. 60/593,189, filed on Dec. 20, 2004.

(51) Int. Cl.
*E04B 9/00*    (2006.01)

(52) U.S. Cl. .............................. 52/477; 52/330; 52/333; 52/386; 52/506.08; 52/327

(58) Field of Classification Search ................... 52/327, 52/329, 330, 333, 384, 385, 386, 389, 418, 52/435, 477, 506.05, 506.08, 511, 700, 762
See application file for complete search history.

(56) References Cited

U.S. PATENT DOCUMENTS

| 1,070,375 | A | * | 8/1913 | Reyam et al. | ................... 52/389 |
| 4,546,024 | A | * | 10/1985 | Brown | .......................... 428/44 |
| 5,069,014 | A | * | 12/1991 | Kubbutat | ...................... 52/235 |
| 5,138,813 | A | * | 8/1992 | Cooney et al. | ................. 52/600 |
| 5,657,597 | A | * | 8/1997 | Loftus | ........................... 52/274 |
| 6,231,663 | B1 | * | 5/2001 | Catterton et al. | ............ 106/705 |
| 6,253,515 | B1 | * | 7/2001 | Kuelker | .................. 52/506.05 |

* cited by examiner

*Primary Examiner*—Brian E Glessner
*Assistant Examiner*—Branon C Painter
(74) *Attorney, Agent, or Firm*—Conley Rose, P.C.

(57) ABSTRACT

A method of constructing a building façade comprising, casting at least one plate member; coupling at least one load member to the plate member; aligning a first façade assembly levelly prior to attachment to the substrate; aligning a second and third façade assembly horizontally adjacent and vertically adjacent the first façade assembly, respectively, by interface with the first façade assembly, and repeating the steps of aligning additional façade assemblies to form a facade.

6 Claims, 9 Drawing Sheets

Fig. 13C

# MORTARLESS FACADE SYSTEM

CROSS-REFERENCE TO RELATED APPLICATIONS

This application is a Continuation In Part of U.S. patent application Ser. No. 11/305,776 filed on Dec. 15, 2005, which is hereby incorporated herein by reference, claiming priority to U.S. Provisional Patent Application No. 60/593,189 filed on Dec. 20, 2004 and titled "Mortarless Modular Precast Cladding System," which is also hereby incorporated herein by reference.

STATEMENT REGARDING FEDERALLY SPONSORED RESEARCH OR DEVELOPMENT

Not applicable.

FIELD OF THE DISCLOSURE

This disclosure relates to cladding systems, specifically to architectural precast modular concrete cladding systems designed to replace building mortars.

BACKGROUND OF THE DISCLOSURE

Brick and stone building façade materials are heavy and energy intensive to manufacture, increasing the costs for production, handling, and transportation. Additionally, they require expensive skilled artisans for installation. Conventional practice for most facade cladding systems requires labor and material intensive full masonry application. Alternate cladding systems comprise manufactured stone, stucco, and either cementitious or hard-coat, synthetic stucco also known as Exterior Insulation Finish Systems (EIFS), and concrete or clay brick cladding. Deficiencies in these systems include the development of mold and dry rot. Additionally, the above cladding systems are crack and failure prone, particularly, when mortar is mixed and/or applied improperly. These systems are also vulnerable to the elements, which prevents the installation during inclement conditions. The cladding systems could further be compromised by a sudden change in the weather during the installation, or within 48 hours after completing the installation, while the mortar is setting up to material strength specifications. The reality is that conventional mortar by its very nature is permeable, even mixed and applied properly under the right weather conditions, and is subject to predictable degradation from the elements.

A representative cladding system is disclosed in U.S. Pat. No. 6,253,513, (Kuelker). This patent discloses a hanger that is cast into a concrete panel. The hangar allows mechanical attachment to a façade. A bead of caulking is applied to collapsible or crushable panel joints to complete the cladding system. However, this cladding system fails to provide the industry with sufficient functionality and durability for installation by unskilled labor. The hangars are designed to be cast-in-place on the back of the concrete panel at point of manufacture. The hangars are designed to have a number of protuberances that are highly prone to damage during transport, delivery, and installation. Even simple deformation of the hangars increases the possibility of failure after installation, and/or damage to the façade. The protuberances are cast into the panel in order to make panel ready for installation. Any customer modifications or damage to the hanger results in costly remanufacturing delays or structural failure of the façade. Hangars having this conformation prevent job site changes, increase expenses, and decrease the durability of the façade. The panels are designed to have collapsible, crushable, or breakable interfaces that expose the panels to water expansion or freeze expansion damage.

Consequently, there is a need in the industry for a modular facade cladding system that is modular, customizable, and durable.

BRIEF SUMMARY

A façade assembly, comprising: a cast panel, having a front face, a rear surface, and a thickness, constructed of at least one base material and at least one filler material; a load member, interfacing with at least a portion of rear surface of the cast panel, having a linear channel with a depth, having a first end and a second end, the first end comprising a passage for mechanical coupler, the second end configured for slidable fitment with a cast panel rear surface; and an alignment feature, having at least one surface adapted for interface between a first cast panel, and second cast panel.

A façade assembly, comprising a cast panel, having a front face, a rear surface, and a thickness, constructed of at least one base material and at least one filler material; a casting plate, interfacing with at least a portion of rear surface of the cast panel having at least one loop formed from a portion of the casting plate, the loop configured for placement in a cast panel, and at least one mechanical coupler; a load member, having a linear channel with a depth, a first end and a second end, the first end comprising a passage, the second end configured for slidable fitment with a cast panel rear surface, at least one passage for mechanical coupling to the casting plate; and an alignment feature, having at least one surface adapted for interface between a first cast panel, and second cast panel.

A method of constructing a façade comprising, casting at least one load member, having at least one loop into a cast panel, to form a pull out resistant façade assembly; aligning a first façade assembly levelly with a portion of a substrate for the facade, prior to attachment to the substrate; aligning a second façade assembly horizontally adjacent the first façade assembly, wherein the second façade assembly is aligned by interface with the first façade assembly, prior to attachment to the substrate; aligning a third façade assembly vertically adjacent the first façade assembly, wherein the third façade assembly is aligned by interface with the first façade assembly, prior to attachment to the substrate; and repeating the steps of aligning additional façade assemblies to form a facade.

A method of constructing a façade comprising, casting at least one plate member, having at least one loop into a cast panel, to form a pull out resistant plate; coupling at least one load member to the plate member to form a façade assembly; aligning a first façade assembly levelly with a portion of a substrate for the façade, prior to attachment to the substrate; aligning a second façade assembly horizontally adjacent the first façade assembly, wherein the second façade assembly is aligned by interface with the first façade assembly, prior to attachment to the substrate; aligning a third façade assembly vertically adjacent the first façade assembly, wherein the third façade assembly is aligned by interface with the first façade assembly, prior to attachment to the substrate; and repeating the steps of aligning additional façade assemblies to form a façade.

BRIEF DESCRIPTION OF THE DRAWINGS

Embodiments of the disclosure will now be described, by way of example only, with reference to the accompanying drawings, wherein:

FIG. 1 illustrates (A) front, (B) side, and (C) top views according to one embodiment of the façade system.

FIG. 7 illustrates (A) front, (B) side, and (C) top views of a reversibly coupled panel and load member according to one embodiment of the façade system.

FIG. 12 illustrates (A) front, (B) side, and (C) rear views according to an embodiment of the façade system.

FIG. 13 illustrates (A) front, (B) side, and (C) rear views according to an embodiment of the façade system.

DETAILED DESCRIPTION OF THE PREFERRED EMBODIMENTS

Figure 1A:
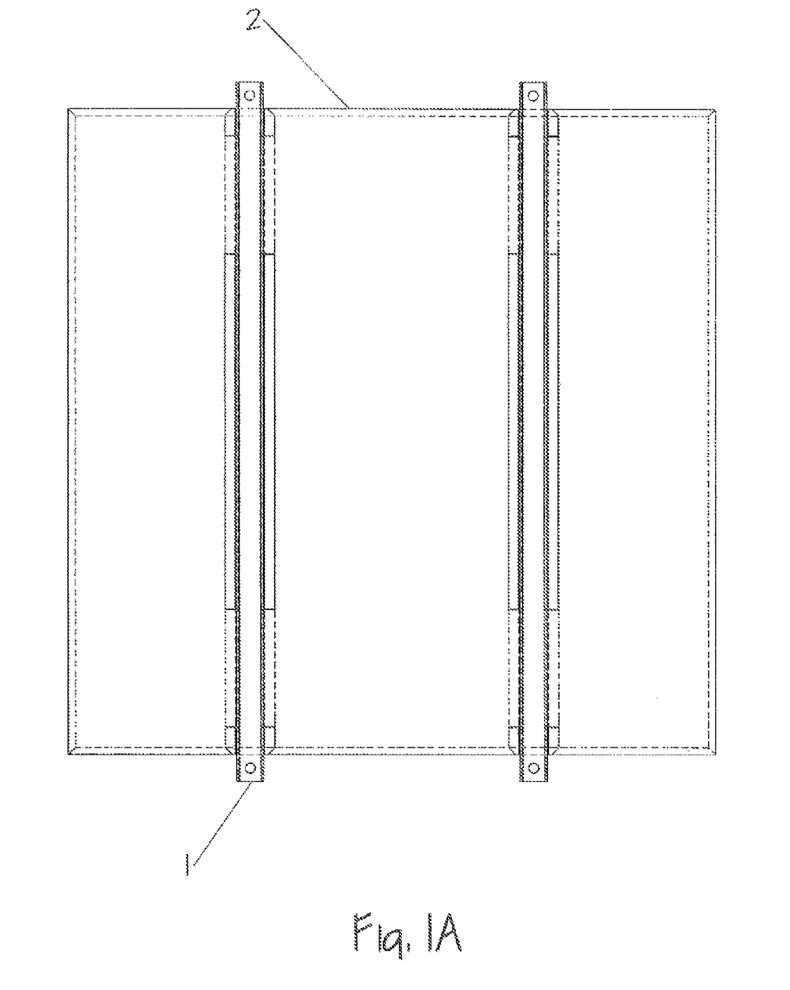
Figure 1B:
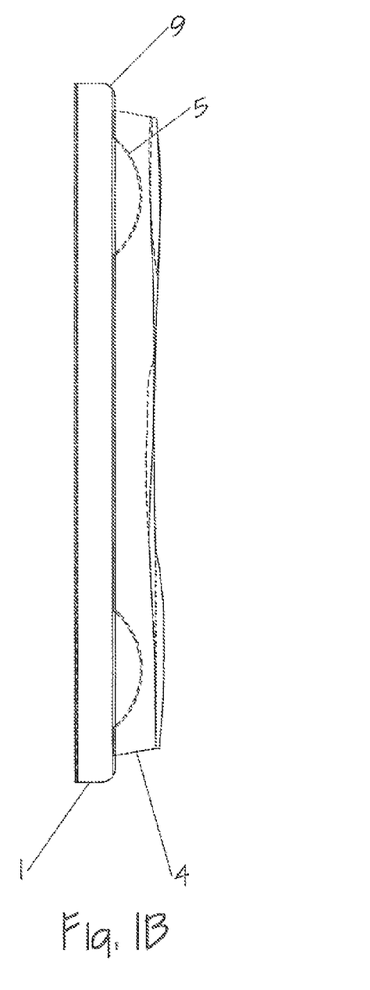
Figure 1C:
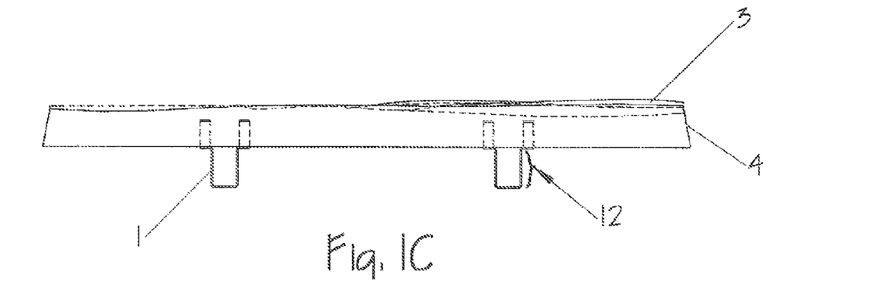

Illustrated in FIG. 1, a façade system comprises a load member 1, and a panel 2. Panel 2 is generally planar in configuration, comprising any geometric shape, without limitation and having a front and rear surface. In certain instances, the panel 2 comprises at least three panel sides 4. Additionally, panel comprises front surface 3. Front surface 3 is configured as a façade surface, an exterior surface, a decorative surface, a faux-masonry surface, a stucco surface, or other aesthetic design surfaces, without limitation, as known to one skilled in the art. Panel 2 is configured for attachment to, coupling to, or mounting to load member 1. Panel 2 is configurable for permanent coupling to load member 1. Alternatively, panel 2 is configurable for reversible coupling to load member 2.

PANEL. Panel 2 is constructed of a composite material; the composite material may be considered a base material, or base media. The base material is configured to be weatherproof, or weather resistant. Additionally, the base material may act as a thermal insulator to insulate a structure from the weather. Possible composite base materials for panel 2 comprise asphalt, cement, Portland Cement, polymer, plastic, resin, epoxy, thermosets, clays, and the like without limitation. Base material may further comprise decorative rock, stone, brick, or mineral derived materials conventionally used in masonry. In certain instances, panel 2 comprises a filler material. panel 2 comprises fillers such as, but not limited to, fly ash, paper, pulp, fiberglass, mesh, lint, screens, foams, polymers, plastics, resins, epoxies, thermosets, clays, and sintered metals. The filler may comprise wire, rope, string, or other linear material. Filler material comprises a woven material, in alternate instances. Without being limited by theory, a filler material decreases the mass of the panel 2. Further, filler improves the thermal insulation properties of the panel 2. Alternatively, filler improves the structural integrity and durability of panel 2.

A Panel 2 further comprises an inter-panel interface. Alternatively, sides 4 comprise the inter-panel interface. In certain instances, side 4 comprises a flush interface such that a substantial portion of each side 4 interfaces with at least one side 4 of an adjacent panel. A flush interface further comprises the surface area of sides 4 interfacing. Alternatively, side 4 comprises interfacial structures, such as without limitation: a bull nose, a tongue-in-groove, an interference ridge, or the like. In certain instances, the side 4 comprises a reversibly coupled interfacial surface. As understood by one skilled in the art, the interfacial structures comprise a physical, mechanical interface; alternatively, a positive coupling between adjacent panels. Further, in certain instances, the interfacial structures act to reduce or eliminate the application of sealers, as discussed hereinafter. Additionally, an interfacial structure improves the durability of the panel and the façade by resisting cracking, crushing, or other mechanical damage and wear during transportation and installation.

Figure 7A:
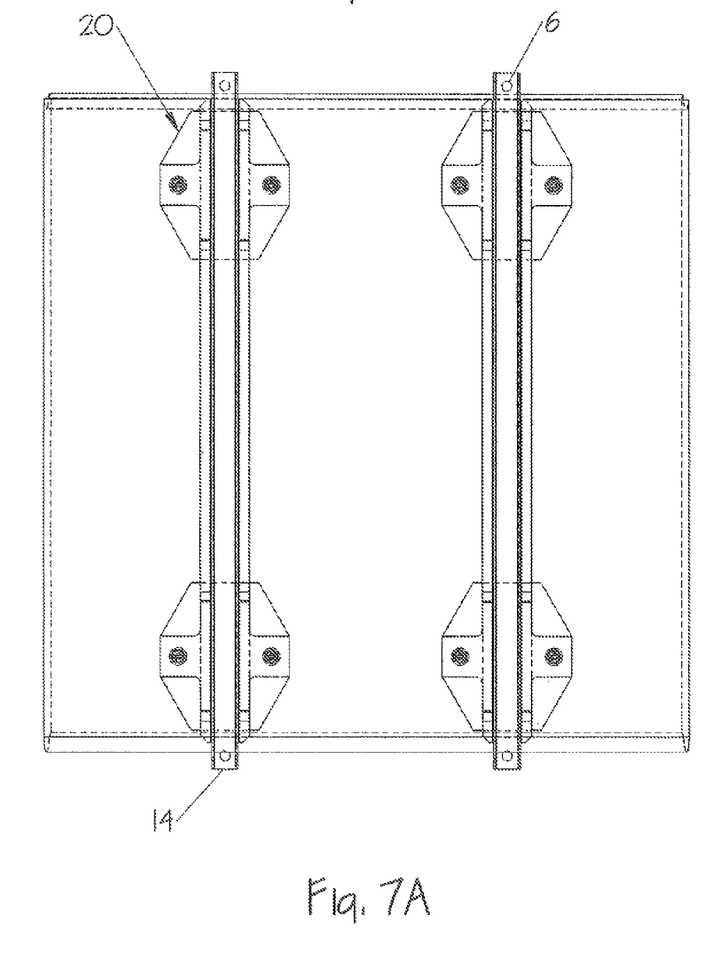
Figure 7B:
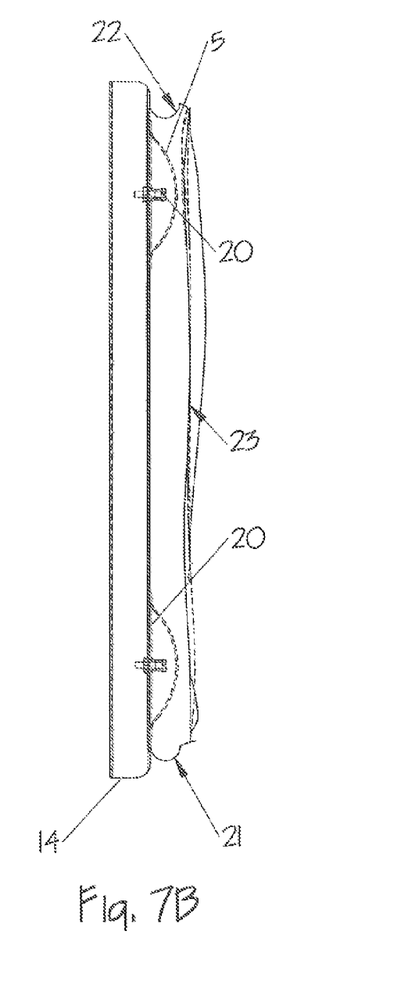
Figure 7C:
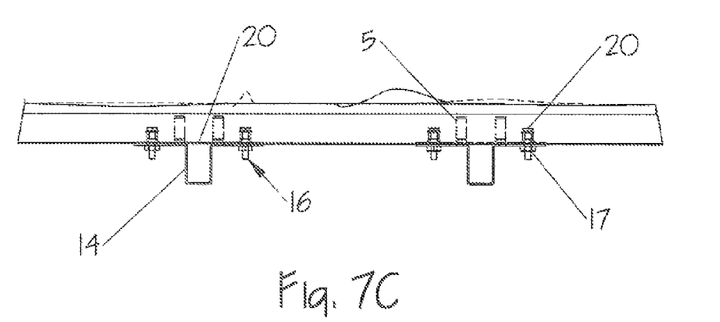

Referring to FIG. 7, panel 2 is configurable to include energy efficient, or energy generating materials. Panel 2 may comprise a thermal material 23, for instance configured to heat water, air, or for cooking applications. Thermal material 23 may comprise a heat sink, a solar panel or film, a thermal convection system. A solar panel may comprise a silicon-based solar panel. In certain instances, the thermal material 23 is a reflective film. Alternatively, the thermal material 23 comprises electricity generating solar film, for instance a copper-indium-gallium-selenide (CIGS) film. Without wishing to be limited by theory, a panel 2 comprising thermal material 23 is positioned within façade system in order to maximize exposure to solar energy.

The panel 2 interfaces comprise a first surface 21 and a second surface 22. The first surface 21 is configured to mate with second surface 22 to form a mechanical interlocking fitment. The first surface 21 is configurable to resist motion in at least one direction. The second surface 22 is configurable to resist motion in at least one direction. The first surface 21 is configurable to support at least one panel 2 along side 4. The second surface 22 is configurable to support at least one panel 2 along side 4. First surface 21 and second surface 22 are configured to interfere minimally with efficient assembly of the façade system.

Figure 12A:
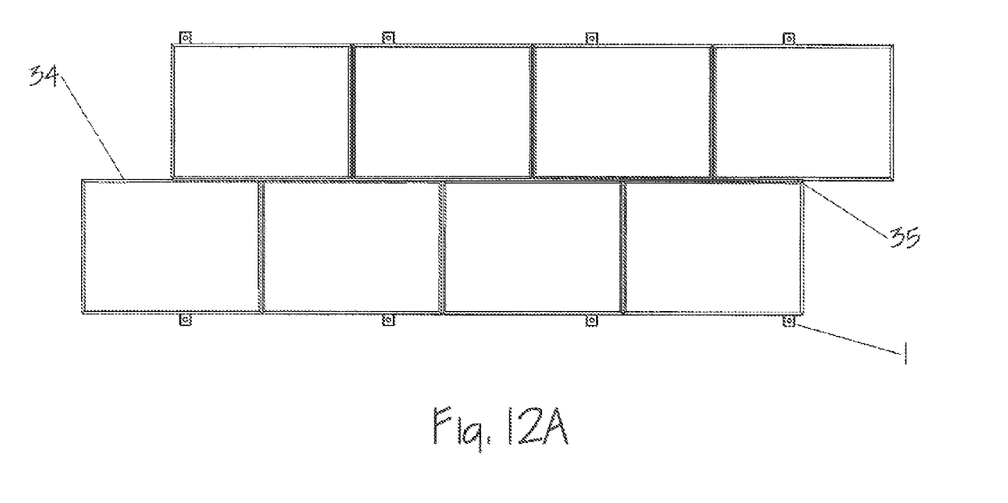
Figure 12B:
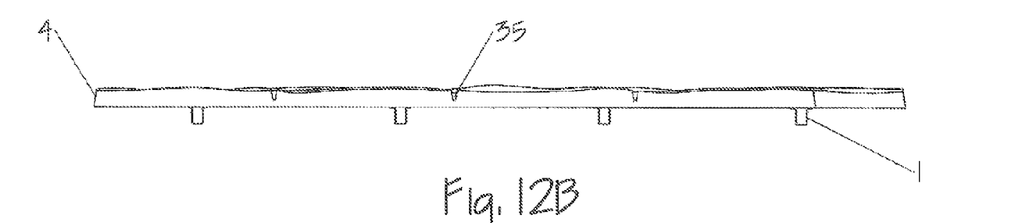
Figure 12C:
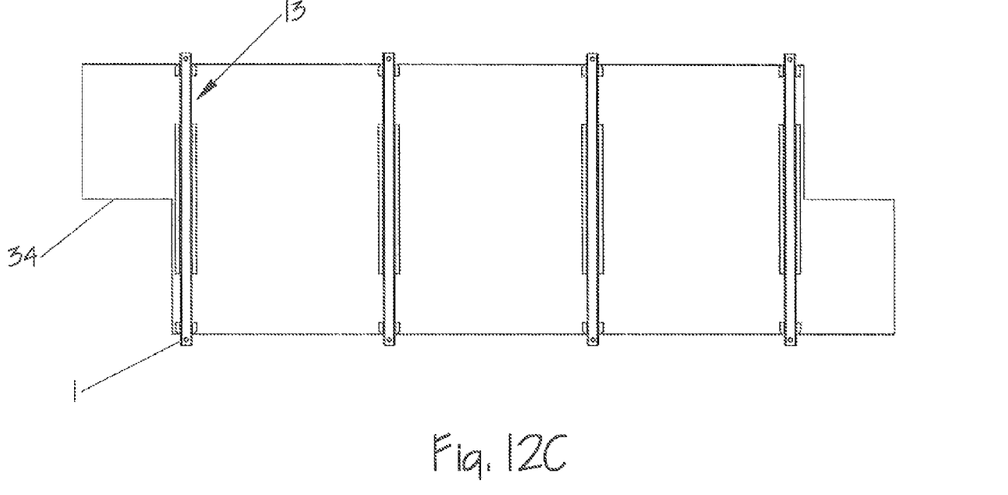

Referring to FIG. 12, the panel 2 may comprise any geometric shape. Alternatively, the panel may comprise a composite shape, having multiple extensions, or indentions. In certain instances, the panel 2 may further comprise false joints 35. In certain instances, the panel 2 is a contiguous panel 34 that includes false joints 35. False joints 35 simulate conventional masonry joints within the front surface 3 of the contiguous panel 34.

Figure 13A:
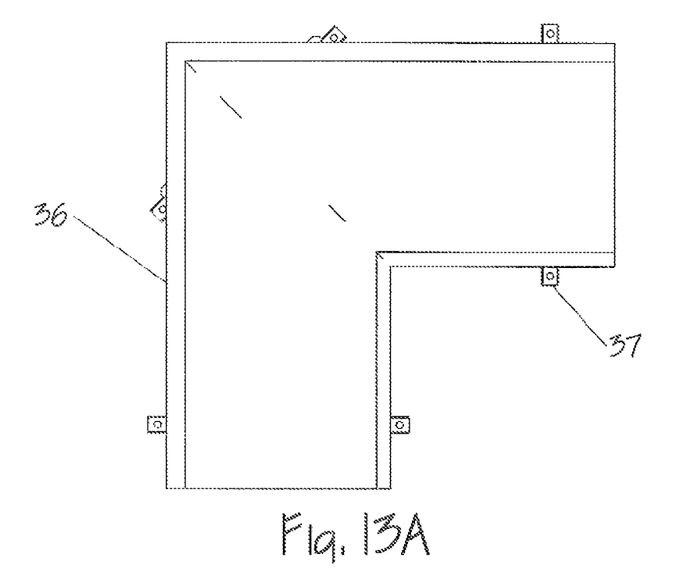
Figure 13B:
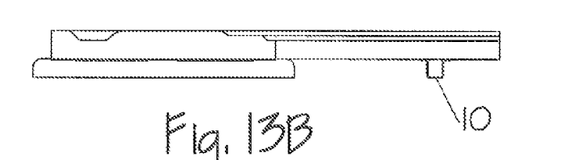
Figure 13C:
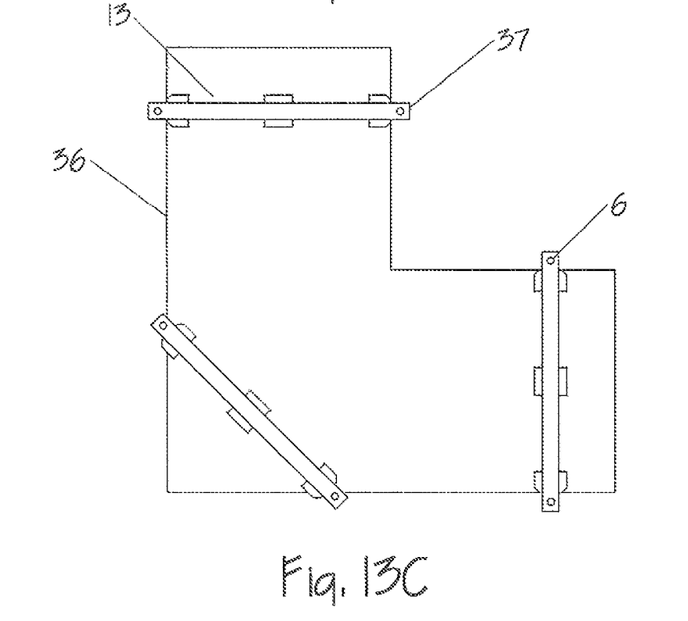

Further panel 2 may be configured to abut a window, door, corner, or other interruption of a façade wall. As illustrated in FIG. 13, panel 2 comprises a corner panel 36. Corner panel 36 is configured to interact with, abut, or otherwise be positioned adjacent to a corner, a window, a door, or other passage through the façade as understood by one skilled in the art.

Figure 2:
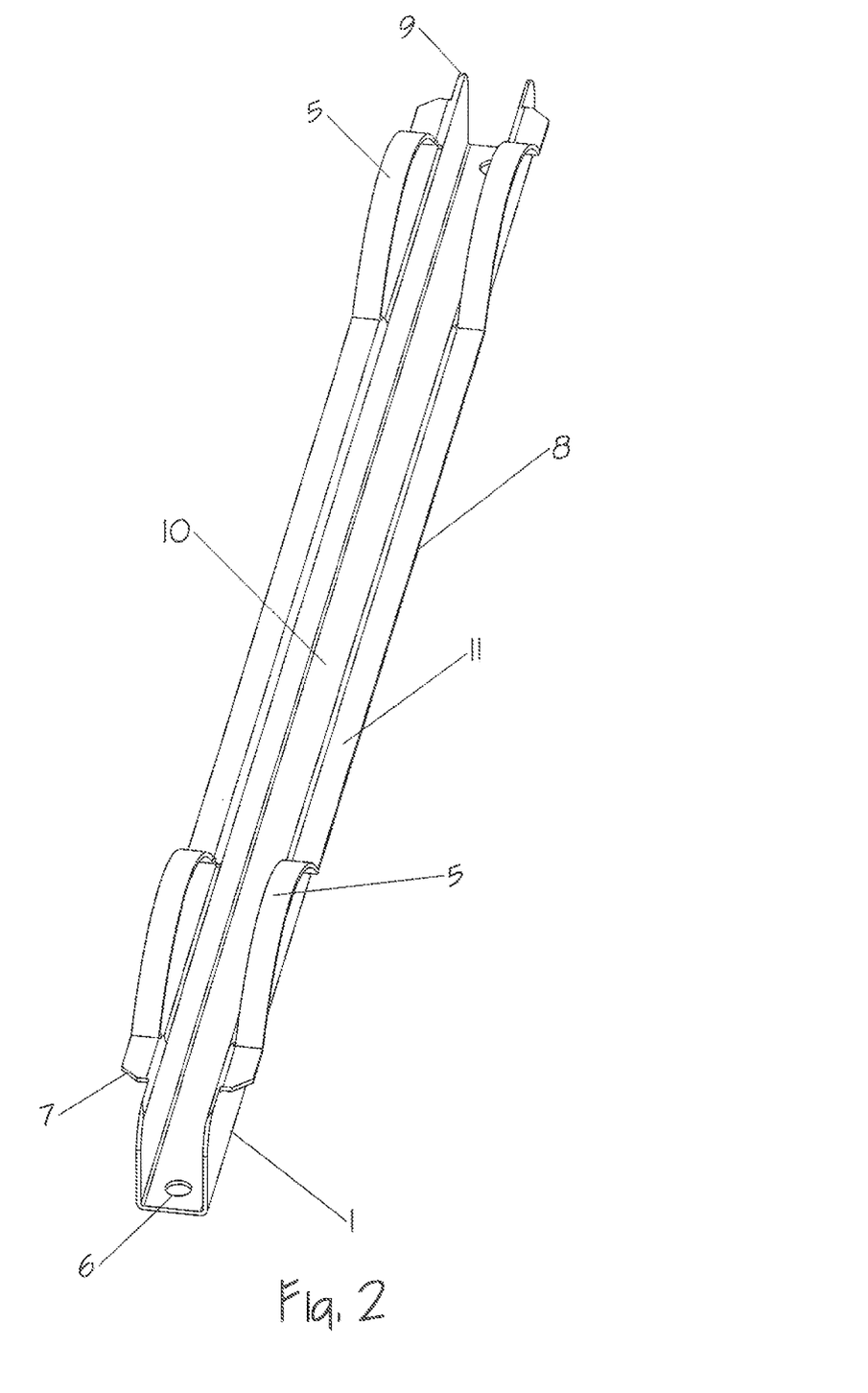
FIG. 2 illustrates a cast-in-place load member according to one embodiment of the façade system.

LOAD MEMBER. Referring to FIG. 2, illustrating a configuration of a load member 1, the load member 1 comprises loop 5, attachment point 6, base flange 7, main flange 8, heel 9, channel 10, and flange interface 11. Attachment point 6 is any interface structure configured for mounting or coupling load member 1 to a vertical face, for instance a building wall, that panel 2 is mounted thereon. Base flange 7, loop 5 and main flange 8 comprises interfaces between load member 1 and panel 2. Loop 5 comprises a partial loop, or semicircular portion of main flange 8 and base flange 7, configured for insertion into panel 2 media during construction, for instance during casting. Main flange 8 and base flange 7 are configured to interface with media during casting such that loop 5 is contained within cast material, and channel 10 is supported thereon.

Load member 1 is configured as a channel 10. Channel 10 is configured as a U-channel or alternatively, channel 10 is configured as a C-channel. In certain instances, channel 10 is a bracket, for instance an L-bracket or a U-bracket. Channel 10 has a depth 12. Depth 12 is configured to provide airspace between the panel 2, and the mounting substrate of the building. Channel 10 is a linear, uncut, and otherwise singular material capable of supporting panel 2 in a vertical position. Channel 10 may be orientated in any direction with respect to the ground during mounting. Heel 9 is a portion of channel 10, configured for tilt-up or tip-in assembly of façade system. The heel 9 comprises a curved, arched, or radiused portion of the channel 10. Main flange 8 is configured to resist torsion, bending, or other stresses imparted on load member 1 by panel 2 during transportation and installation. Base flange 7 is configured to ease installation. Base flange 7 comprises a sloped, cut, curved, arched, or radiused return end of the flanged portion of load member 1. The base flange 7 is configured for tilt-up, tip-in, or other methods of assembly of the façade system involving slidably positioning adjacent panels 2.

Load member 1 is constructed of any material suitable for supporting panel 2. Further, load member 1, is constructed out of any material suitable for exposure to environmental conditions such as weather changes. Load member 1 construction comprises, metal, metal alloy, polymer, epoxy, composites, or the like without limitation. In certain instances, load member 1 is formed in a single unit, for instance, forged. Alternatively, load member 1 is constructed in a manner that comprises minimal protrusions. In certain instances, load member is designed and constructed such that all protrusions are mounted in a double attachment configuration. Without limitation by any particular theory, load member 1, comprising double attachments, is configured to increase the durability of load member 1. Further, the double and multiple attachment configurations comprise resistance to bending, breaking, impacts, shear, thermal stress, or damage during shipping and installation Loop 5 is configured for cast-in-place manufacturing of panel 2. The loop 5 comprises at least two couplings to channel 10; generally, the load member 1 comprises at least one loop 5. Alternatively, load member 1 comprises at least two loops 5, and in further instances, load member comprises at least four loops 5. Loop 5 is coupled to main flange 8 by at least one portion. Loop 5 is coupled to base flange 8, by at least two portions. Loop 5 may comprise a plurality of loops, such that loop 5 has an 'M' shape, or other shapes without limitation. In certain instances, loop 5 may comprise a plurality of loops disposed within main flange 8.

Figure 3:
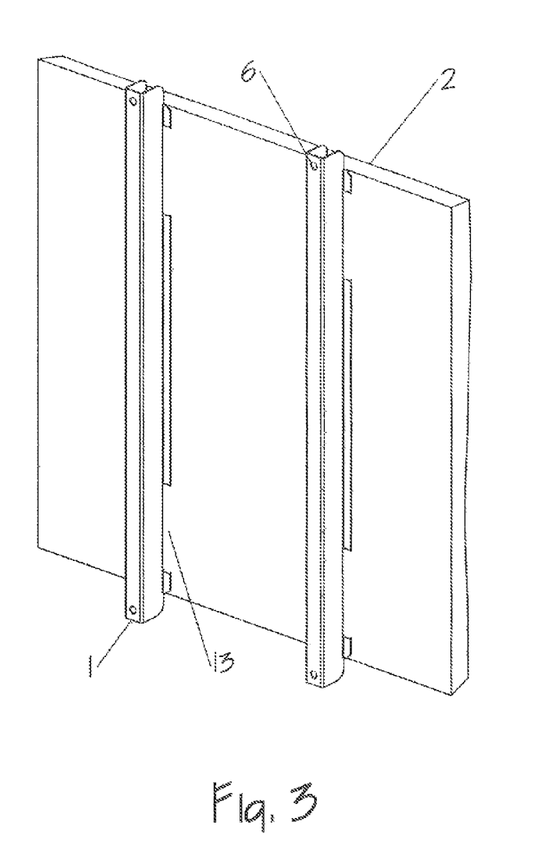
FIG. 3 illustrates a rear view of a cast-in-place panel according to one embodiment of the façade system.

Referring now to FIGS. 1 and 3, an illustration of a cast-in-place instance of panel 2, illustrates the shear and pull out resistance of load member 1. Loops 5 are imbedded in matrix 13 of panel 3. In certain instances, the loops 5 form a shear prevention unit; as the loops 5 are imbedded in the matrix 13 of the panel 2, they resist pullout of the panel 2. In certain instances, matrix 13 passes through loops 5, under channel 10, such that the matrix 13 acts as a cross brace resistant to shear and pullout. Further, in instances where panel 2 and matrix 13 comprise fillers, the fillers comprise an additional shear or pullout resistance. Without limitation by theory, as envisioned the pullout of loop 5 from panel 2 would require the fracture, shear, and displacement of a portion of matrix 13. Comparatively, a linear cast-in place attachment between a panel and load member would not demonstrate a panel imparted shear resistance, and as such would be capable of pulling out of panel. The cast-in-place configuration of panel 2 comprises resistance to bending, breaking, impacts, shear, thermal stress, or damage during shipping and installation Additionally, as illustrated in FIG. 13, the load member 1 may comprise a short member 37. In certain instances, the short member is configured for interface with a panel 36 having an alternate configuration, shape, or size. In certain instances, the short member 37 is longer than the load member 1. The short member 37 is configured as a U-channel 10. Short member 37 includes the same or similar structures as load member 1, such as an attachment point 6. Without wishing to limited by theory, short member 37 is an alternate configuration of load member 1.

Figures 4, 5:
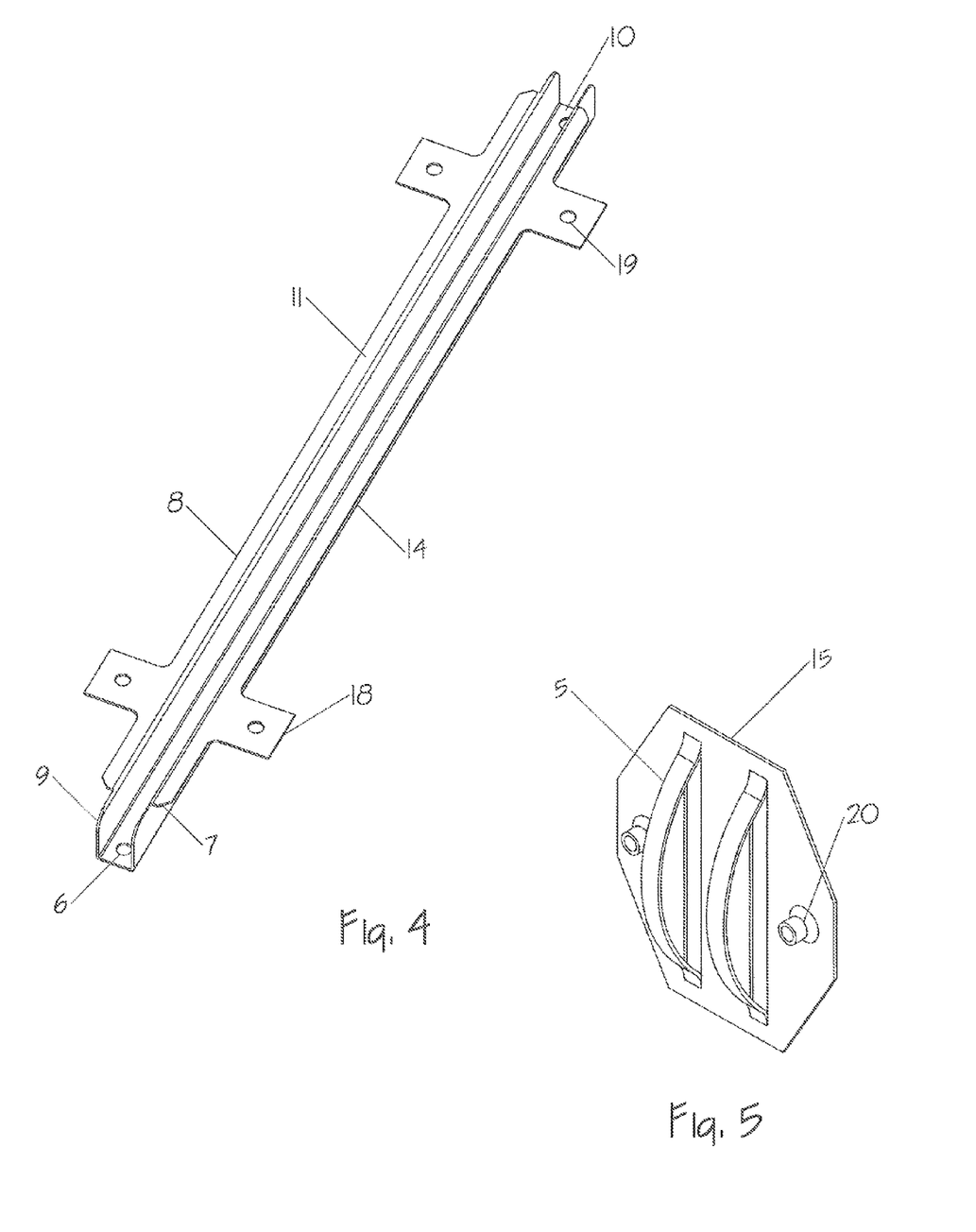
FIG. 4 illustrates a reversibly coupled load member according to one embodiment of the façade system.
FIG. 5 illustrates a reversibly coupled panel plate according to one embodiment of the façade system.

REVERSIBLE COUPLING PANEL. Referring now to FIGS. 4 and 5, illustrating in an alternate configuration of attachable or reversibly coupled load member 14, that is configurable for on-site assembly. The attachable load member 14 is configured for reversible coupling to the panel 2. The panel 2 is constructed or cast to include a mounting plate 15. The attachable load member 1 is configured for reversible coupling to panel 2, via incorporated mounting plate 15. The attachable load member 14 is configured for coupling to mounting plate 15 by any means known to one skilled in the art, for instance a bolt, screw, or other means.

FIG. 5 illustrates mounting plate 15 comprising loop 5 and bung 20. Mounting plate 15 is configured as a generally planar interface configured to be cast into a panel. The loop 5 comprises at least two couplings to mounting plate 15; generally, the mounting plate 15 comprises at least one loop 5. Alternatively, mounting plate 15 comprises at least two loops 5, and in further instances, mounting plate 15 comprises at least four loops 5. Loop 5 is coupled to mounting plate 15 by at least one portion. Loop 5 is coupled to mounting plate 15, by at least two portions. Loop 5 may comprise a plurality of loops, such that loop 5 has an 'M' shape, or other shapes without limitation. In certain instances, loop 5 may comprise a plurality of loops disposed within mounting plate 15.

Loops 5 are imbedded in matrix 13 of panel 3, for example, as illustrated in FIG. 3. In certain instances, the loops 5 form a shear prevention unit; as the loops 5 are imbedded in the matrix 13 of the panel 2, they resist pullout of the panel 2. In certain instances, matrix 13 passes through loops 5, under channel 10, such that the matrix 13 acts as a cross brace resistant to shear and pullout. Further, in instances where panel 2 and matrix 13 comprise fillers, the fillers comprise an additional shear or pullout resistance. Without limitation by theory, as envisioned the pullout of loop 5 from panel 2 would require the fracture, shear, and displacement of a portion of matrix 13. Comparatively, a linear cast-in place attachment between a panel and load member would not demonstrate a panel imparted shear resistance, and as such would be capable of pulling out of panel.

REVERSIBLE COUPLING LOAD MEMBER. As illustrated in FIG. 4, load member 14, comprises mounting tabs 18, including mounting hole 19, in place of loops 5 previously discussed. Mounting tabs 18 are configured as extensions of main flange 8. Mounting tabs 18 may have any conformation, including rectangular tabs, as illustrated, semi-circular, semi-oval, rounded, arched, curved, or triangular. Alternatively, mounting tabs 18 may comprise an arch, loop, or eye flange in the same plane as main flange 8.

Further, Load member 14 is configured as a channel 10. Channel 10 is configured as a U-channel or alternatively, channel 10 is configured as a C-channel. In certain instances, channel 10 is a bracket, for instance an L-bracket or a U-bracket. Channel 10 has a depth 12. Depth 12 is configured to provide airspace between the panel 2, and the mounting substrate of the building. Channel 10 is a linear, uncut, and otherwise singular material capable of supporting panel 2 in a vertical position. Channel 10 may be orientated in any direction with respect to the ground during mounting. Heel 9 is a portion of channel 10, configured for tilt-up or tip-in assembly of façade system. The heel 9 comprises a curved, arched, or radiused portion of the channel 10. Main flange 8 is configured to resist torsion, bending, or other stresses imparted on load member 14 by panel 2 during transportation and installation. Base flange 7 is configured to ease installation. Base flange 7 comprises a sloped, cut, curved, arched, or radiused return end of the flanged portion of load member 1. The base flange 7 is configured for tilt-up, tip-in, or other methods of assembly of the façade system involving slidably positioning adjacent panels 2.

REVERSIBLE COUPLING ASSEMBLY. The configuration of the façade system, improves spatial efficiency during transportation and storage of panel 2 and load member 14. Further, as load member 14 is configured to linearly extend beyond the dimensions of panel 2, separate transportation prevents damage to load member 14. Additionally, in the case of a damaged panel 2 or damaged load member 14, only damaged component is disposed of, or alternately, recycled. In these circumstances, the undamaged panel 2, or undamaged load member 14 are still functional for assembly. Further, the substantially linear, and monolithic load member 14

Bung 20 comprises a structure configured to accept a mechanical coupler 16. A coupler may comprise a bolt, a screw, a pike, a post, a nail, or any mechanical coupler 16 without limitation. Bung 20 comprises a bung or a threaded receiver for a bolt or screw. Bung 20 further comprises a polymer or resin. In instances bung 20 comprising a polymer or resin is a receiver for a mechanical coupler. Without being limited by theory, a polymer or resin receiver for a screw or bolt is resistant to galvanic corrosion. Bung 20 is configured to protrude into matrix 13 of panel 2 during casting. Bung 20 is configured to protrude into a portion of matrix 13 of panel 2, such that matrix 13 surrounds the bung 20. In certain instances, the depth of bung 20 is correlated to the length of mechanical couple, such as a bolt or a screw. The mechanical coupler is preferably equal to or shorter than the depth of bung 20 to prevent damage to matrix 13.

Alternatively, bung 20 protrudes from the back of mounting plate 15. In certain instances, bung 20 is a post; alternatively, a threaded rod. Bung 20, as a threaded rod, is configured for receiving a nut, other threaded retainer, or similar mechanical couplers 16. Bung 20 is configured for passage through the mounting tab 18 via the mounting hole 19 of the load member 1. In certain instances, the bung 20 is configured to retain a locking nut or the like. Alternatively, the bung 20 is configured such that a small passage may pass therethrough. The small passage is configured for retaining a cotter pin, safety wire, or c-clip.

Figure 6:
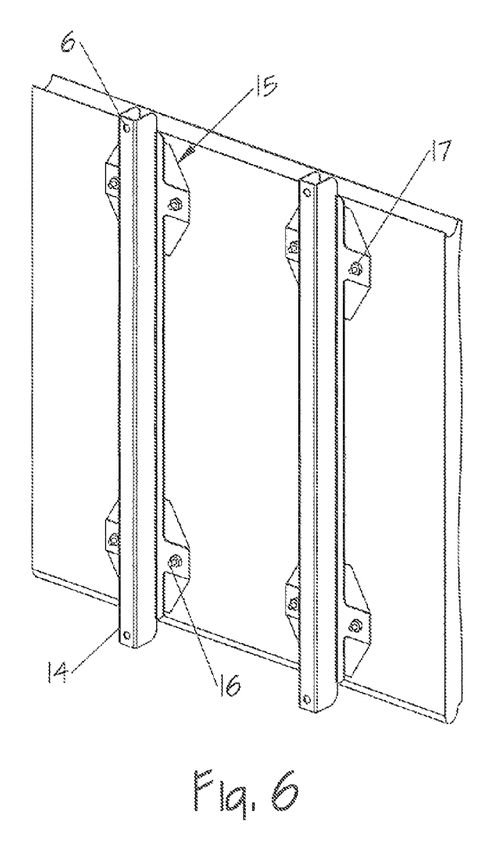
FIG. 6 illustrates a rear view of a reversibly coupled panel and load member according to one embodiment of the façade system.

In preferred embodiments, the mounting plate 15 is for removable coupling of panel 2 to support member 14, and further, to any particular façade or building. The coupling of panel 2 by loop 5 to the mounting plate 15 comprises coupling means for reversibly securing load member 14 to panel 2. Bung 20 is configured to interface with mounting tabs 18 of load member 14 as illustrated in FIG. 6. Load member 14 is coupled to mounting plate 15 by mechanical coupler 16. As described herein above, a mechanical coupler is inserted through mounting tab 18 via mounting hole 19. Mechanical coupler 16 is fastened by interface with bung 20. Alternatively, bung 20 passes through mounting tab 18 via mounting hole 19. A mechanical coupler 16 is fastened to bung 20, for instance a nut, to couple load member 14 to mounting plate 15.

FAÇADE ASSEMBLY. The load member 1 and panel 2, when coupled as described hereinabove, are configured for installation as a façade as illustrated in FIGS. 8 through 11. The load member 1 and panel 2 are positioned level with, or parallel to the foundation of the building. Without limitation by theory, a building foundation is horizontally leveled during the pouring and setting of concrete. Additionally, the subfloor and exterior walls 24 of the building, built atop the foundation are substantially level. Further, the walls 24 are oriented vertically, normal to the plane of the foundation and supported by the interior structure of the walls, for instance studs 29. Wall 24 and studs 29 typically comprise wood. In certain instances, plywood, or other layered composite wood products. Alternatively, wall 24 and studs 29 comprise aluminum, steel, other metals, or polymer composites, for instances resins. Walls 24 are configured for both structural integrity of the building, and hermetically sealing the building from the precipitation 35. Walls 24 are susceptible to penetration by a second mechanical coupler. In certain instances, second mechanical coupler comprises a nail, screw, or bolt sufficient for attachment to wall 24.

The façade system is assembled by positioning the panel 2, parallel to the foundation. In instances, the alignment edge 27 comprises a self leveling feature, such that alignment of the panel 2 parallel to the foundation level is simplified. In certain instances, self-aligning properties of alignment edge 27 comprise extensions, grooves, alignment marks, or other striations that assist an unskilled laborer in directionally aligning the panel. Further, the alignment edge 27 is configured to interact with other panels in the façade system. Alignment edge 27 is configured to align vertically adjacent panels 2 with the foundation. Alignment edge 27 on vertically adjacent panels aligns panels with foundation from the base of a building to the top of the façade. Alternatively, the panel 2 comprises alignment edge 27 for orienting the panel 2 differentially, for example at an angle relative to the foundation.

Further, panel 2 comprises vertical edge 28. Vertical edge 28 is configured for self-alignment of horizontally adjacent panels, for instance a row of panels along the building. In certain instances, self-aligning properties of vertical edge 28 comprise extensions, grooves, alignment marks, or other striations that assist an unskilled laborer in directionally aligning the panel. Further, the vertical edge 28 is configured to interact with other panels in the façade system. Vertical edge 28 is configured to align horizontally adjacent panels 2 normal to the foundation. Vertical edge 28 on horizontally adjacent panels aligns panels with foundation from the corner of a building to the opposite corner of the building. Alternatively, the panel 2 comprises alignment edge 27 for orienting the panel 2 differentially, for example at an angle relative to the foundation. Without limitation by theory, the alignment edge 27 and the vertical edge 28 allow the façade to be positioned.

Figure 8:
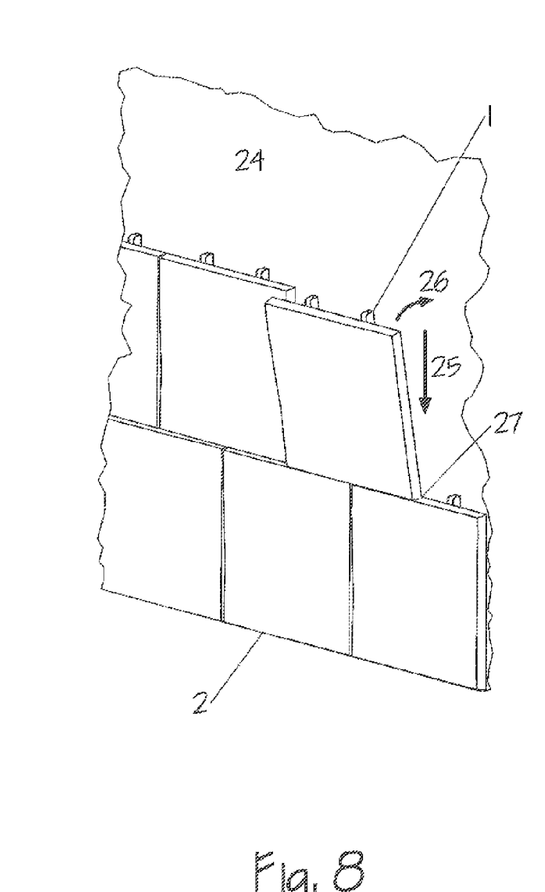
FIG. 8 illustrates a façade assembly according to one embodiment of the façade system.
Figure 9:
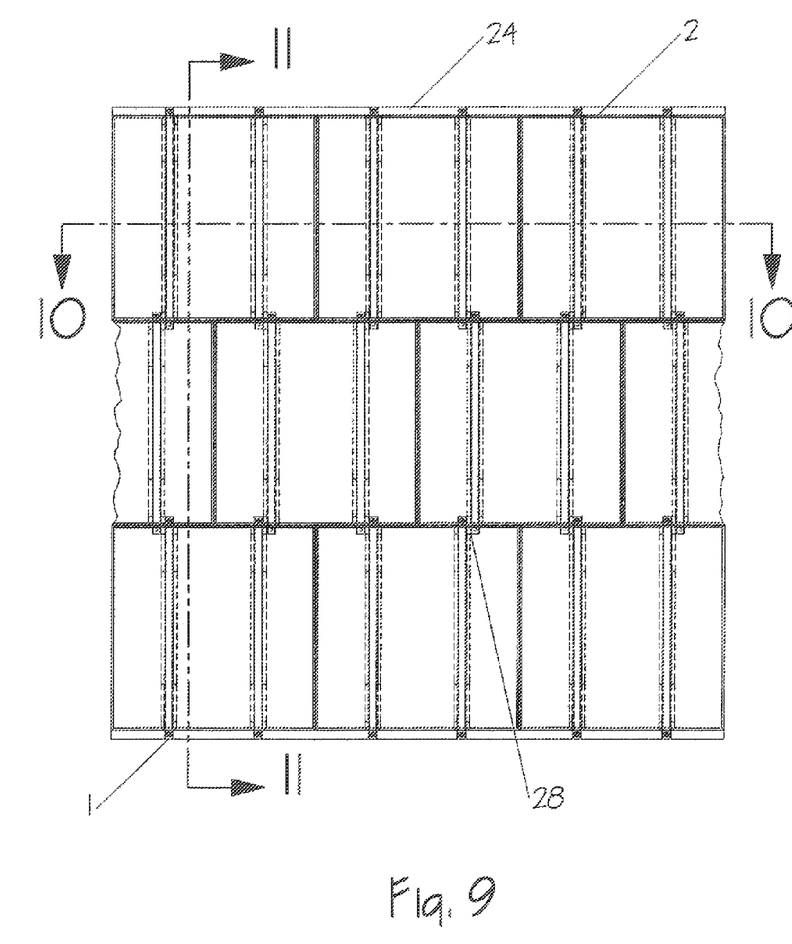
FIG. 9 illustrates a front view of a façade assembly according to one embodiment of the façade system.

Further, after alignment with the foundation the panel 2 is affixed to the exterior walls 24 by a second mechanical coupler, passing through attachment point 6 and fixed to wall 24. In embodiments, a row of panels 2 is installed against or on wall 24, along the foundation or the base of the wall. Referring now to FIG. 8, in a vertical sequence the next row is installed by sliding the heel 9 of the load member 1, behind the lower panel 2 in a vertical direction 25. Once the heel 9 and load member 1 are positioned the panel 2 is tilted along path 26. During the process along path 26, alignment edge 27 of the panel 2 horizontally aligns the vertically adjacent panel rows such that they are parallel with the foundation. In certain instances, the panel 2 comprising load member 1 is configured for slidable alignment, in order to vertically align the panel 2. Vertical alignment 2 along vertical edge 28 comprises slidable alignment. This method of installation comprises a tip-in, tilt-in, tip-up, or tilt-up method of installing multiple rows of panels, vertically adjacent to another, without limitations.

Figure 10:
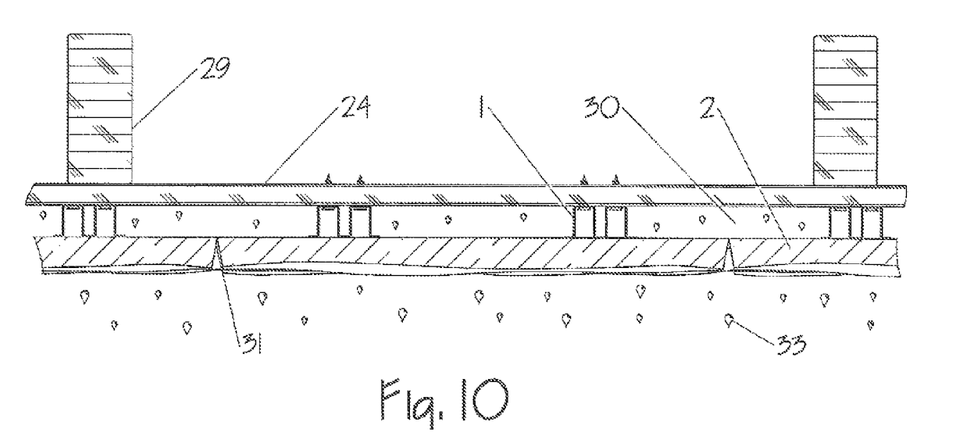
FIG. 10 illustrates vertical cross-section of the façade assembly in FIG. 8, according to one embodiment of the façade system.
Figure 11A:
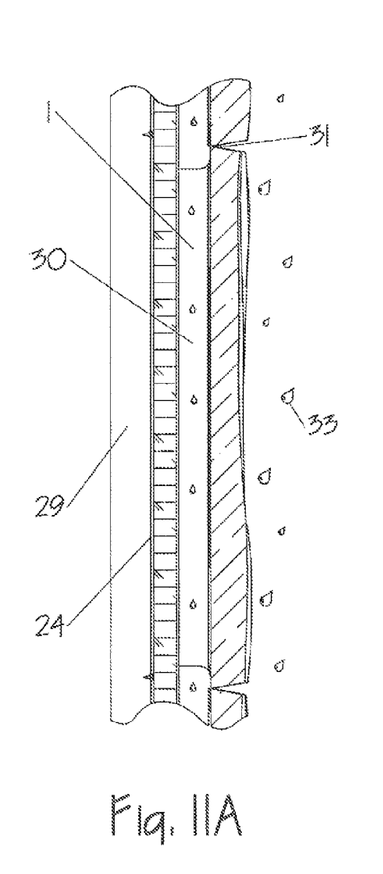
FIG. 11 illustrates the horizontal cross-section of the façade assembly according to the embodiments of the façade system.
Figure 11B:
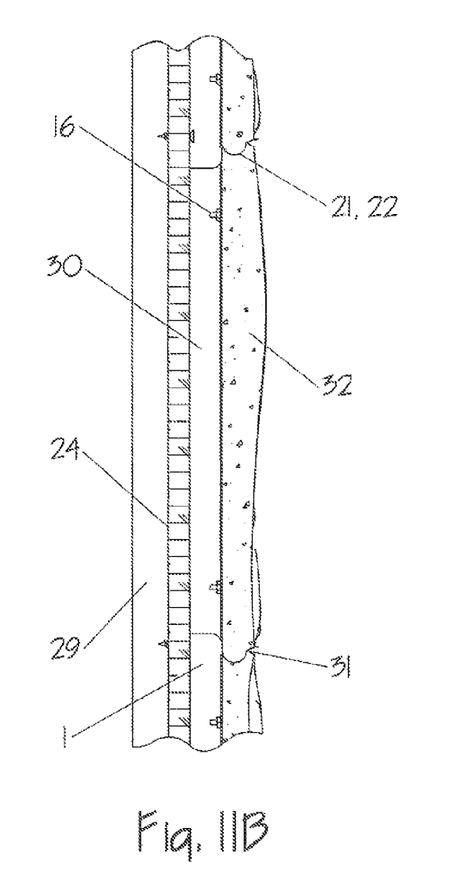

Referring now to FIGS. 10 and 11, illustrating vertical and horizontal cross-sections of the façade system respectively. Load member 1 is fixedly coupled to wall 24, which is supported by stud 29, by the second mechanical coupler 16. In instances, the load member 10 is spaced from wall 24 about the distance of depth 12 of U-channel 10; as such this forms airspace 30. In certain instances, airspace 30 comprises a means to flow air or water behind panels 2. Airspace 30 is configured to allow the penetration of precipitation beyond panels 2. Airspace 30 is further configured to drain precipitation from building. Airspace 30 may further comprise a gutter, tube, or other drainage components. As understood by one skilled in the art, airspace 30, provides an air flow around the building for insulation, thermal regulation, mold abatement, mold reduction, and weather resistance. Further, airspaces 30 provide a building with additional room for electrical, telecommunications, water, gas, waste, and other conduit, without limitation.

Alternatively, airspace 30 is sealed from precipitation 33 by a sealant 31. Sealant 31 comprises any known to one skilled in the art, for instance silicone, urethane, epoxy, resin, or the like without limitation. In certain instances, sealant 31 further comprises a hardener, a matrix, a cross-linker, or other supplemental materials without limitation. Sealant 31 comprises an external component such as sand, grit, ash, or any other particulate matter suitable to alter the appearance of the sealant. In embodiments, sealant 31 appears as conventional mortar or conventional masonry joints.

DISCUSSION. In one aspect the disclosure provides an assembly for constructing a mortarless modular precast cladding system for residential and commercial buildings. Said assembly monolithic in form, comprised of a plurality of precast concrete tiles or panels of predetermined dimension and geometry, manufactured with an engineered multi-purpose mechanical connector cast-in-place at point of manufacture. Said mechanical connection consisting of either predetermined gauge galvanized steel, or predetermined comparable strength material, of substantial breadth to provide maximum resilience to deformation from mishandling during either transport or on the job site. Said connector fabricated in symmetrical and undeviating geometry, of raised, constant and uniform profile to provide a predetermined engineered drainage gallery and airspace between said tiles or panels and the structure. Said connector fabricated in a continuous U-shape symmetrical geometry to also provide automatic alignment and self-leveling adjustments during installation.

In another aspect the disclosure provides an independent mechanical connection device, of equivalent breadth, form and geometric properties as referenced above in said channel connector. This separate connection device provides specifically for anchoring or fastening after point of manufacture, generally on the job site, to said mortarless modular precast concrete tiles or panels referenced above. Said connection device to provide for simple, rapid and uniform installation of connector in the field to said precast concrete units by unskilled labor.

Finally yet another aspect of the disclosure provides a preassembled structural and architectural wall assembly that can be shipped and erected in one monolithic form, or assembled sandwich style rapidly on the job site. The advantage of this aspect is that the disclosure precludes the need, per conventional building practice, for two separate wall components or applications to provide one ultimate wall assembly for both structural and architectural, or aesthetic finish.

In certain instances, an alternative description of the current disclosure, comprises a façade that is designed:

(a) to provide both an improved and alternate mortarless mechanical connection design that offers the manufacturer the option of either cast-in-place channel connectors embedded at point of manufacture, or producing the precast cladding units without the connectors in place, and anchored after manufacture on the job site.

(b) to provide precast manufacturers with a channel connector that can be fastened later in the field, as opposed to cast-in-place only, to allow automated and robotic production plants to mass produce the system, and achieve better economies of scale with manufacturing, shipping and handling efficiencies.

(c) to provide an improved connection device or multi-purpose channel connector, with an undeviating geometric shape and profile, fabricated of stronger and more durable material, to better endure the foreseeable potential for mishandling during transport to the job site and staging of materials on the site.

(d) to provide an improved multi-purpose channel connector of undeviating geometric shape and profile that offers an improved and uniform drainage gallery or rainscreen, to better deflect higher volumes of rainwater common in wetter climates and coastal regions.

(e) to provide an improved multi-purpose channel connector of symmetrical geometric shape and profile that allows for automatic alignment and self leveling features, to offer simple, rapid and uniform installation by unskilled labor, and to reduce the margin of error common with cladding systems that otherwise require these alignment and leveling adjustments manually in the field.

(f) to provide an architectural precast cladding system that can be panelized, manufactured in larger tile and panel dimensions, with architectural façade joints cast in the fascia only that give the appearance of several individual tiles, but are in fact cast as one single panel, that provides significant manufacturing, shipping and handling efficiencies, for both producers and installers.

(g) to provide an architectural precast cladding system that can be manufactured from recycled materials, such as fly ash, coal combustion by products, and recycled fibers, rather than conventional Portland cement, thereby addressing the growing shortages and rising costs of Portland cement.

(h) to provide a cladding system that given the use of the recycled materials referenced above, allows the producer to manufacture a precast cladding system that results in superior architectural definition, workability and likeness of texture to natural materials such as stone, granite, slate and limestone.

(i) to provide a precast cladding system that is stronger in material compressive strength and lighter in material weight due to the use of these recycled materials, and more environmentally resourceful as these recycled materials would otherwise require disposal in landfill sites.

(j) to provide a unique cladding system that is engineered to withstand settlements due to post construction subsidence, common in new housing developments, thermal expansion of manufactured concrete products during acute thermal cycles, and certain seismic activity that could typically degrade the aesthetic and structural properties of masonry concrete cladding systems.

(k) to provide a cladding system that can be preassembled at the plant, or rapid sandwich style on the job site, to structural wall members such as precast tilt-up walls, the new lightweight precast aerated concrete panels, and also the new prefabricated structures and homes, thereby offering a monolithic combination structural/architectural wall assembly in one form, that precludes the need for 2 separate wall components or applications, as with conventional building practice and current façade systems in the market.

(l) to provide an improved method of manufacturing precast concrete panels, tiles, moldings and architectural trim and accessories for windows, doors and columns, by producing multiple units simultaneously with each pouring of concrete, as opposed to the conventional practice of casting units individually.

(m) to provide an architectural precast cladding system that has the capability to embed the new ultra thin and lightweight printable film solar cells in the precast units themselves, to convert natural sunlight into functional energy sources within the confines of the respective property and structure. Further objects and advantages of my disclosure will become apparent from a consideration of the drawings and ensuing description:

Reference is made to FIGS. 1 and 3, which show a perspective view of the disclosure from the front, back, side and top view. The conceptual functionality of the disclosure for a mechanical connection of the cladding unit to the building sheathing is illustrated in FIG. 2. The embodiment of the channel connector to the back of the precast cladding unit is illustrated in FIG. 1B. Specifically, FIGS. 1 and 3 show the front and perspective view of the architectural precast cladding unit 2, with the top and bottom of the embedded channel connector 1 shown from the front view in FIG. 1A. The precast cladding unit 2 can be of variable dimension and texture. This could be in the form of a tile that ranges from 6" wide by 12" high, to 18" wide by 12" high, for residential applications. Alternatively, a panel that approximates 60" wide by 18" high for both residential and commercial applications. Said panel 2 being cast with false architectural façade joints cast in the fascia only that give the appearance of several individual tiles or units, but in fact is cast as one single panel 2 to provide manufacturing, shipping and handling efficiencies. The multi-purpose channel connector 1 shown in dual dimensional view in FIG. 2 is fabricated so as to be of undeviating or uniform shape and raised profile. The engineering logic here is to design a structural member which is symmetrical and resistant to mishandling and consequential damage during transport. This connector 1 is 19 gauge galvanized steel, aligned vertically on the back face of the precast unit, and fabricated so as to withstand impact without deforming the shape of the member. A U-shape or profile channel connector 1 that provides a ½" to ¾" drainage gallery, depending on the grade of application and region of the country, between the cladding and the structure, given the raised profile of the channel connector 1. The pullout shear strength on the connectors 1 is over 300 pounds for a precast cladding unit 12" high by 18" wide. This precast unit 2 weighs less than 10 lbs. Therefore the mechanical connection design for the cladding system 2 has a safety factor of 30. The connector design could support vertical wall loads that are 30 times greater than the weight imparted by the precast cladding units 2 on the connectors 1 themselves. The mechanical connection design for the cladding system 2 is comprised of one connector 1 for a precast unit 2 that is 6" wide by 12" high as illustrated in FIG. 1. Two connectors 1 may be used for precast units 2 that are 12" by 12" and 12" high by 18" wide. Three connectors 1 total for precast units 12" high by 24" wide, and 4 connectors 1 total for precast units 2 12" high by 36" wide may be used. Larger panels 18" high by 60" wide require 5 to 6 connectors 1 total.

The raised channel connectors 1 in FIG. 2 measure ¾" at the butterfly heel 9 and taper to ⅜" at the toe of the channel 10. The connectors 1 have 2 screw holes 6 drilled into each part, one each at the top and bottom of every connector 1. These holes 6 accommodate 1" #6 galvanized screws (not shown) to attach the precast units 2 to the building. The connectors 1 are longer then the precast units 2, protruding ½" above the top and below the bottom of each unit 2. This provides for total concealment of the connectors 1 once the installation is complete. It also provides a full interlock mechanism, whereby the top hole 6 of every connector 1 is screwed to the building sheathing, and the bottom of the channel connector 1 simply slides behind the top of the preceding course of precast concrete units 2.

Finally, a connector 1 that is engineered to provide an interlocking mechanism 9 with the precast cladding units 2 both above and below and a uniform geometric profile that provides automatic alignment and self-leveling adjustments for the installer. Working from the bottom up only the precast cladding unit 2 can only be aligned one way on the building, and this in direct relation to the preceding course of units 2. The raised and consistent profile of the channel connector 1 provides an automatic leveler, as opposed to having to set stone or brick in a bed of mortar that has no rigidity or guide for leveling, until the mortar sets up later. The connectors 1 could also be fabricated from alternate materials such as some plastics and carbon composites, given the high tensile strengths of these materials.

A variation of the cladding system 2 provides detailed architectural trim, moldings or accessories that can be used to accent and finish areas around doors, windows, and columns. These precast units 2 could be of the same texture as used in the body of the cladding or veneer, or of a contrasting texture to provide accent or definition of these finishing trim units.

FIG. 10 shows the drainage gallery 30, cavity, or rainscreen that results from the raised profile of the channel connector 1 once connected to the structure 24. Depending on which connection design is used this drainage gallery 30 ranges from ½" to ¾" in dimension. The rainscreen design provides engineered protection against mold and dry rot, as moisture is deflected from the cladding 2 and the building 24 to a discharge point for drainage. Additionally this gallery or gap 30 in between the cladding 2 and the building 24 provides airspace for ventilation and pressurization equalization. FIG. 10 further illustrates a sectional view of the precast cladding units 2 in tandem with joints 31 that have been sealed with an expandable polyurethane sealant. This sealant is specially formulated for dynamically moving building joints 31. This expandable sealant can accommodate dynamic and anticipated building 24 movements from foundation soils post construction, thermal expansion and certain seismic activity.

This provides the cladding system 2 with the ability to withstand up to 50% joint space deflection from post construction dynamics. The dimension of the joint is generally ½" in width and ¾" in depth. The sealant is designed for temperatures that range from a low of minus 65 F to a high of 180 F. Once the joint 31 is caulked the sealant is sand-coated by brush. This replicates the appearance of a traditional masonry joint, although a much more durable and functional joint than the conventional masonry joint.

The manufacture of this type of precast cladding system 2 is generally achieved with a wet cast fabrication process. This method involves the pouring of wet slurry premixed in accordance with the particular product specifications. One of the variables in the mix design could be whether the application is residential or commercial, non-coastal or coastal regions, and the texture or finish required. The slurry is dispensed from overhead hoppers and controlled by an operator who directs the slurry into custom molds or forms. Typical industry practice would have these filled molds moving continuously on a conveyor belt system, where they are unloaded onto a vibrating or shaker table. The vibration increases the material density through compaction and distribution of the water with the solids to form a cohesive mass within the mold. The molds are then moved to a staging or curing area that is climate controlled to allow the precast units to set or cure properly prior to demolding, packaging, and shipping. This conventional practice is labor intensive and does not provide for efficient mass production and economies of scale.

The preferred embodiment of the disclosure provides an improved method for manufacture and mass production of the cladding system 2. This method provides for dispensing the slurry with controlled dosage into multi-cavity forms, configured in sheet orientation to house multiple master molds. For the preferred embodiment the molds have interior cavities to retain the channel connectors 1 in place during the pour. The molds are filled to capacity, whereby vibration commences from a platform directly underneath the multi-cavity forms. Once the vibration is complete mechanized carriers move the forms to curing rooms where the precast units 2 are cured prior to packaging and shipping. This method of manufacture allows for producing multiple precast units 2 simultaneously to achieve improved economies of scale.

Referring now to FIGS. 3 and 6, the illustrations show an example of the precast cladding unit 2, with the multi-purpose channel connector 1 cast-in-place at point of manufacture. A galvanized screw is threaded through the hole 6 in the top of the channel connector. This attaches the monolithic cladding system 2 in a simple, repetitive, and uniform manner to the sheathing of the structure 24 as illustrated in FIGS. 8 and 10. Architectural accessories and finishing trim 6 can be used to accent the cladding 2. Various textures can be replicated to produce the look of natural materials such as stone, slate, granite and limestone. The mechanical connection 1 of the cladding system 2 provides a drainage gallery 24, or rainscreen FIG. 8, and airspace between the materials to protect against mold, moisture and dry rot problems. The mortarless modular precast cladding installation is completed by caulking the joints 31 with an expandable sealant. This provides the cladding system 2 with the ability to withstand post construction settlements, thermal expansion, and certain seismic activity. Specifically, the mortarless modular precast cladding system 2 has the capability to withstand up to 50% joint deflection due to these conditions as discussed previously. Finally, the sealant is sand coated by brush stroke to replicate the aesthetic appearance of a traditional masonry joint. References above to particular dimensions, sizes and shapes are not disclosed to be restrictive to the disclosure. Rather they are provided as examples of conceptual functionality, with variations thereof that are further contemplated as inherent derivatives and extrapolations within the body of the disclosure.

FIGS. 3 and 6 illustrate one embodiment, and the operation of this embodiment involves a plurality of modular precast cladding units 2 with a multi-purpose channel connector 1 that is embedded into the back face of the precast units 2 at point of manufacture. These precast cladding units 2 can consist of tiles, panels and architectural accessories or moldings to accent or finish the main body of the cladding 2. This arrangement allows the monolithic cladding system 2, comprised of the precast cladding unit 2 together as one with the channel connector 1, to be simply screwed to the sheathing of the building 24. The installation is completed by caulking the joints with a specially formulated sealant that is then sand coated to replicate a traditional masonry joint.

An alternative embodiment of the disclosure is shown in FIGS. 6 and 7. This arrangement provides a plurality of modular precast cladding units 2 with a multi-purpose channel connector 14 that is not cast-in-place. Rather, the multi-purpose channel connector 14 is anchored or fastened to the back face of the precast cladding units 2 after manufacture, generally on the job site.

The operation of this alternative embodiment again involves a plurality of modular precast cladding units 2 with a mechanical connection method 14. The difference being that in this arrangement the channel connectors 14 are not embedded at point of manufacture. Rather, the connectors 14 are anchored or fastened to the back face of the precast cladding units 2 after manufacture. This is generally done on the job site. The operation and interconnection of the system components and parts under this arrangement does not deviate from the most preferred embodiment referenced above, other than when the connectors 14 are attached to the back face of the precast units. The advantage to this alternative embodiment is of substantial magnitude. This being that some manufacturers operate fully automated production facilities, with some of these facilities operating strictly with the use of robotics. A modular precast cladding system 2 with a mechanical connector 14 that is not cast-in-place allows achievable manufacturing efficiencies relating to economies of scale, which would not be achievable if the connector was required to be embedded only at point of manufacture. This alternative embodiment also simplifies handling and freight.

Another alternative embodiment of the disclosure is shown in FIG. 12. This unique arrangement again involves a plurality of modular precast cladding units that employs a multi-purpose mechanical channel connector that is cast-in-place at the point of manufacture. However, the difference under this additional alternative embodiment is again of substantial magnitude. The mortarless modular precast cladding system can be preassembled to a structural wall component in a separate and unrelated production facility. This can be a production facility that manufactures structural wall panels, also known as precast tilt-up panels used to build commercial, industrial and institutional structures. Or a plant that manufactures the new prefabricated homes and structures, that offer advantages compared to conventional job site only building practice. The advantage this arrangement offers is one of a preassembled, fully integrated structural/architectural wall assembly shipped and erected in one form. Thereby precluding the need, per conventional building practice, for 2 separate wall components or applications. Building one separate structural wall assembly or member, to be followed by a second separate wall system or application for aesthetic or architectural finish, with one ultimate wall assembly.

The operation of this additional alternative embodiment again involves a plurality of mortarless modular architectural precast cladding units that employs a cast-in-place mechanical connector. The operation and interconnection of the components and parts of the cladding system under this additional alternative embodiment does not deviate from the most preferred embodiment referenced above. The advantage to this additional alternative embodiment is substantial. This arrangement will provide a preassembled, fully integrated structural/architectural wall assembly that can be shipped in one form and erected on the job site in one form. Thereby saving the rising costs of job site labor, and the need, per conventional practice, to build 2 separate wall systems to provide one ultimate wall assembly.

Accordingly, the reader will see that this disclosure is novel and useful for a multitude of reasons. The disclosure offers manufacturers a choice of whether their production processes should provide for the mechanical connector to be cast-in-place at point of manufacture, or anchored to the precast units later in the field. Apart from the economics of improved economies of scale for mass production, the alternative embodiment offers packaging and shipping advantages. The disclosure provides an improved mechanical connection device, method and form compared to U.S. Pat. No. 6,253,515 to Kuelker, 2001 Jul. 3. These improvements relate to a more durable and substantive connector better able to absorb foreseeable mishandling during transport and job site installation. A manufactured-to-tolerance connector that provides an improved drainage gallery and airspace, for better-engineered protection against mold, moisture and dry rot conditions. A symmetrical connector of undeviating geometry and uniform profile that provides automatic alignment and self-leveling features for the installers. A mortarless modular precast cladding or facade system that provides manufacturing, shipping and handling efficiencies, given the panelizing concept to reduce the need for numerous small pieces. The utilization of recycled materials in the manufacturing process provides economic, architectural and environmental advantages when compared to using conventional Portland cements. The disclosure provides a new modular precast cladding or façade system with the ability to withstand post construction settlements, acute thermal cycles, and certain seismic activity. The provision of a preassembled, fully integrated structural and architectural wall assembly that can be shipped and installed in one monolithic form provides substantial comparative advantages for economics and logistics.

While my above description contains much specificity, these should not be construed as limitations on the scope of the disclosure, rather as an exemplification of one preferred embodiment thereof. Many other variations are possible and contemplated. For example this precast cladding system, given its mortarless and modular composition, is also ideally suited for interior wall tile applications that also currently require full masonry materials and installation Another example is the means for improving the mass production of modular precast units with a casting method that employs multi-cavity molds configured in sheet or gang orientation so as to produce multiple units simultaneously, compared to the conventional practice of pouring concrete into individual molds or forms one at a time. Accordingly, the scope of the disclosure should be determined not by the embodiments outlined and illustrated, but by the appended claims and their legal equivalents.

I claim:
1. A façade assembly, comprising:
a cast panel, having a front face, a rear surface, and a thickness, constructed of at least one base material and at least one filler material;
at least two plates, each plate having a planar configuration including, a top surface and a lower surface, a thickness measured between the top surface and the lower surface, and a width measured across the top surface, wherein the plate further comprises a loop, and at least one mechanical coupler;
wherein at least a portion of the rear surface of the plate has the at least one loop formed from a portion of the plate, the loop extending from a first end to a second end, with a longitudinal axis therebetween, the loop having a width measured perpendicular to the longitudinal axis and parallel to the plane of the plate, wherein the width of the loop is greater than the thickness of the plate, the loop configured for embedding in a cast panel rear surface; and
wherein the at least one mechanical coupler comprises a fastener receptor extending from the top surface, through the plate, and extending away from the lower surface, perpendicular to the plate;
a load member, having a linear channel defined by a base member and two parallel sidewalls arranged perpendicular to the base member; the channel extending between a first end and a second end, with a longitudinal axis oriented therebetween, and a longitudinal plane oriented parallel to the sidewalls and perpendicular to the base member;
wherein the sidewalls include an outer edge surface having a flange extending perpendicularly away from the longitudinal plane between the first end and the second end;
wherein each flange includes at least one extended coupler, disposed adjacent the first end and the second end, the coupler having a passage for a mechanical coupling; and
wherein the first end further comprises a passage, and the second end is configured for slidable fitment with a cast panel rear surface, at least one passage for mechanical coupling to the casting plate; and
an alignment feature disposed on the cast panel, having at least one surface adapted for interface between a first cast panel, and second cast panel, the alignment feature resistant to mechanical damage.

2. The assembly of claim 1, wherein the façade assembly is configured for reversibly coupling the casting plate to the load member.

3. The assembly of claim 1, wherein the loop has a casting depth of less than about the thickness of the cast panel.

4. The assembly of claim 3, wherein the at least one loop comprises a pull-out resistance.

5. The assembly of claim 1, wherein the alignment feature further comprises a cast panel edge.

6. The assembly of claim 5, wherein the alignment feature comprises one structure configured for self-alignment chosen from a bull nose, a tongue-in-groove, an interference ridge, and combinations thereof.

* * * * *